(12) United States Patent
Harada et al.

(10) Patent No.: US 6,357,789 B1
(45) Date of Patent: Mar. 19, 2002

(54) SEAT PROVIDED WITH SIDE AIR BAG SYSTEM

(75) Inventors: Masami Harada; Yosuke Higashi, both of Tochigi-ken (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 09/557,671

(22) Filed: Apr. 25, 2000

(30) Foreign Application Priority Data

| Jun. 24, 1999 | (JP) | 11-178305 |
| Dec. 9, 1999 | (JP) | 11-350352 |
| Dec. 9, 1999 | (JP) | 11-350353 |
| Dec. 27, 1999 | (JP) | 11-369228 |

(51) Int. Cl.⁷ ............................................. B60R 21/22
(52) U.S. Cl. ........................ 280/730.2; 280/728.3; 297/216.13
(58) Field of Search ................ 280/728.1, 728.2, 280/728.3, 730.1, 730.2, 743.1; 297/216.1, 216.13

(56) References Cited

U.S. PATENT DOCUMENTS

| 5,498,030 A | * | 3/1996 | Hill et al. ................ 280/728.2 |
| 5,749,597 A | * | 5/1998 | Saderholm ............... 280/728.2 |
| 5,810,389 A | * | 9/1998 | Yamaji et al. ........... 280/730.2 |
| 5,893,579 A | * | 4/1999 | Kimura et al. .......... 280/728.3 |
| 5,938,232 A | * | 8/1999 | Kalandek et al. ....... 280/730.2 |
| 5,967,546 A | * | 10/1999 | Homier et al. .......... 280/730.2 |
| 5,988,674 A | * | 11/1999 | Kimura et al. .......... 280/728.3 |
| 6,045,151 A | * | 4/2000 | Wu .......................... 280/728.3 |
| 6,074,003 A | * | 6/2000 | Umezawa et al. ....... 280/730.1 |
| 6,095,602 A | * | 8/2000 | Umezawa et al. ....... 280/730.2 |
| 6,213,498 B1 | * | 4/2001 | Ghalambor et al. ..... 280/728.2 |

FOREIGN PATENT DOCUMENTS

| JP | 1178762 | 3/1999 |

* cited by examiner

Primary Examiner—J. J. Swann
Assistant Examiner—Christopher Bottorff
(74) Attorney, Agent, or Firm—Dann Dorfman Herrell and Skillman, P.C.

(57) ABSTRACT

In a seat with a side air bag system, of two stay cloths (9, 10) continuously extending from a sewing portion corresponding to a breaking portion (8, 80) of a trim cover (7), one stay cloth (9) is taken into a cavity (3) from an opening edge of a back pad (2) so as to fasten a take-in end within the cavity, the other stay cloth (10) is rolled in a rear side of the back pad (2) from a front side of an air bag system (1) so as to fasten a roll-in end in the rear side of the back pad, and the air bag system is wrapped by the two stay cloths. Accordingly, each of the stay cloths (9, 10) can be easily assembled and the air bag system (1) can be directly wrapped by the two stay cloths so as to efficiently concentrate an inflating pressure of the air bag on the sewing portion corresponding to the breaking portion (8, 80) of the trim cover (7), thereby quickly inflating and developing the air bag.

2 Claims, 11 Drawing Sheets

SEAT PROVIDED WITH SIDE AIR BAG SYSTEM

BACKGROUND OF THE INVENTION

1. Field of the invention

The present invention relates to an improvement of a seat with a side air bag system in which an air bag system installing an air bag capable of inflating and developing outward due to a gas pressure is provided in a side portion of a seat back.

2. Description of the Related Art

Conventionally, as a seat with a side air bag system, there has been proposed the seat provided with the side air bag system in which a trim cover is sewed so as to form a bag shape, a breaking portion of the trim cover is formed at a sewing portion between a front surface cover portion and a side surface cover portion, two stay cloths are sewed to the sewing portion corresponding to the breaking portion of the trim cover at one end portion so as to be provided inside the trim cover, and the air bag system is wrapped by the stay cloths so as to be mounted and installed in a side plate of a seat back frame (Japanese Patent Application Laid-Open No. 11-78762).

In the seat provided with the side air bag system, it is preferable that, since an inflating pressure of the air bag can be concentrated on the sewing portion corresponding to the breaking portion of the trim cover by the stay cloths so as to easily break the sewing portion, thereby securely inflating and developing the air bag and an inflating balance and a developing directionality of the air bag can be stably defined.

In the seat provided with the side air bag system, it is necessary that the stay cloths are assembled so as to easily wrap the air bag system and are provided in such a manner as to wrap the air bag system and effectively concentrate the inflating pressure of the air bag on the sewing portion corresponding to the breaking portion of the trim cover, thereby securely inflating and developing the air bag.

Accordingly, an object of the present invention is to provide a seat with a side air bag system in which stay cloths are easily assembled so as to wrap an air bag system and the stay cloths are provided in such a manner as to wrap the air bag system and concentrate an inflating pressure of the air bag on a sewing portion corresponding to a breaking portion of a trim cover, thereby quickly inflating and developing an air bag.

SUMMARY OF THE INVENTION

In accordance with a main feature of the present invention, there is provided a seat provided with a side air bag comprising:
- an air bag system installed so as to be capable of inflating and developing outward due to a gas pressure, and being positioned within a cavity provided in a side portion of a back pad so as to be mounted to a side plate of a seat back frame;
- a sewing portion of a trim cover covering a provision side of the air bag system, the sewing portion forming a breaking portion of the trim cover according to an inflation and development of the air bag; and
- two stay cloths sewed to the sewing portion corresponding to the breaking portion of the trim cover at one end portion thereof so as to wrap the air bag system, the stay cloths being provided inside the trim cover,
- wherein one stay cloth is taken into the cavity from an opening edge of a back pad so as to fasten a take-in end within the cavity, the other stay cloth is rolled in a rear side of the back pad from a front side of the air bag system so as to fasten a roll-in end in the rear side of the back pad, and the air bag system is wrapped by two stay cloths. Accordingly, since each of the stay cloths can be easily assembled and the air bag system can be wrapped by two stay cloths, the structure can be made such that the inflating pressure of the air bag can be effectively concentrated on the sewing portion corresponding to the breaking portion of the trim cover, thereby quickly inflating and developing the air bag.

The other features will be apparent from a mode of an embodiment for carrying out the invention mentioned below.

DETAILED DESCRIPTION OF THE PREFERRED EMBODIMENTS

Figure 1:
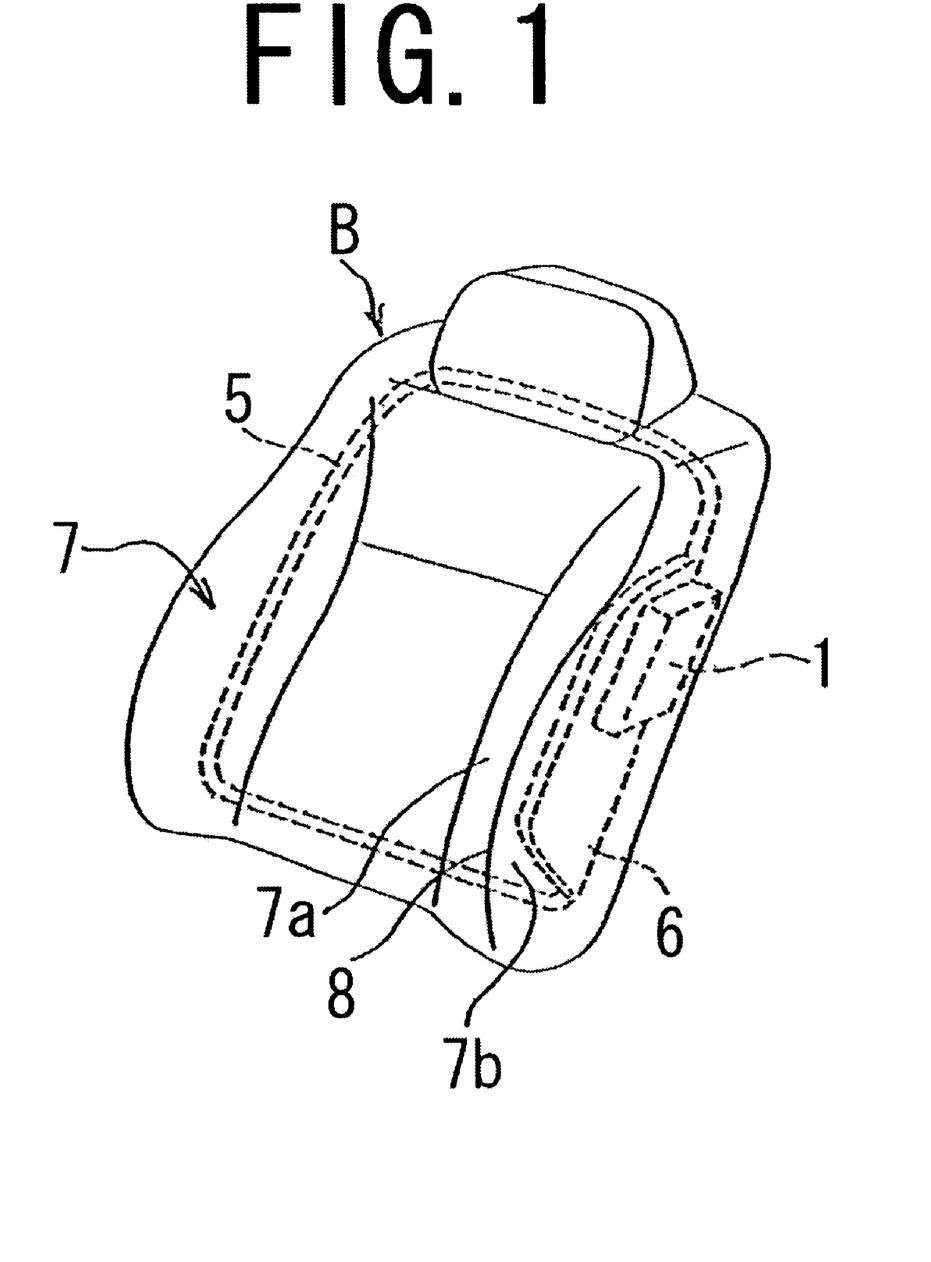
FIG. 1 is a perspective view showing a seat back of a seat with a side air bag system according to the present invention.

A description will be given below of an embodiment with reference to the accompanying drawings. FIG. 1 shows a seat back B of a passenger seat in which an air bag system 1 is accommodated and provided in a right side portion as seen from a right side of a vehicle. In this seat back B, there is provided the air bag system 1 accommodating an inflator and an air bag which are not particularly illustrated within an air bag case which can be opened due to an inflating pressure of the air bag and connected to an impact sensor provided in a side of a vehicle by a circuit.

Figure 2:
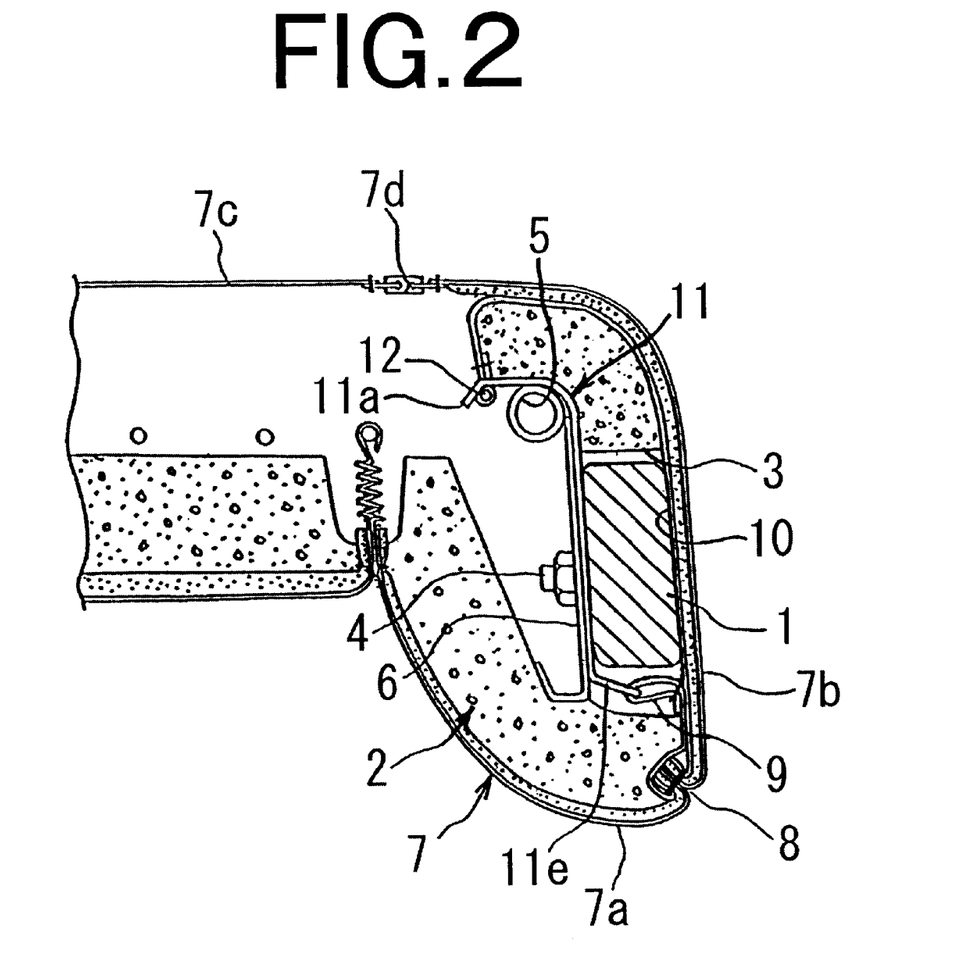
FIG. 2 is a cross sectional view showing a seat back of a seat with a side air bag system according to a first embodiment of the present invention in a side portion.

The air bag system 1 is accommodated and positioned in a cavity 3 provided in a side portion of a back pad 2 as shown in FIG. 2, is mounted and fixed to a side plate 6 of a seat back frame 5 by two fastening bolts 4 (only one of them is illustrated) protruding from an air bag case, and is installed in an inner portion of the seat back B by covering the whole back pad 2 including the cavity 3 with a trim cover 7.

The trim cover 7 can be formed by employing a single material such as a leather, a synthetic leather, a fabric or the like or a wadding cover integrally laminated by a surface material, a wadding material and a backing material. The trim cover 7 corresponds to the seat back B having a bank portion, and is formed in a bag shape by sewing a front surface cover portion 7a covering right and left bank surfaces from a center of a seat surface and a side surface cover portion 7b extending from a peripheral side surface to a back surface and foldably mounting a back surface cover portion 7c to a slide fastener 7d.

In the trim cover 7, a breaking portion 8 broken according to an inflation and a development of the air bag is formed from a sewing portion between the front surface cover portion 7a covering the right and left bank surfaces from the center of the seat surface and the side surface cover portion 7b extending from the peripheral side surface to the back surface. The sewing portion corresponding to the breaking portion 8 can be sewed so as to be easily broken due to a stress generated by the inflation of the air bag while keeping a strength sufficient to resist against a normal use by sewing about No. 8 count yarn and about No. 20 count yarn as vertical sewing yarns.

Figure 3:
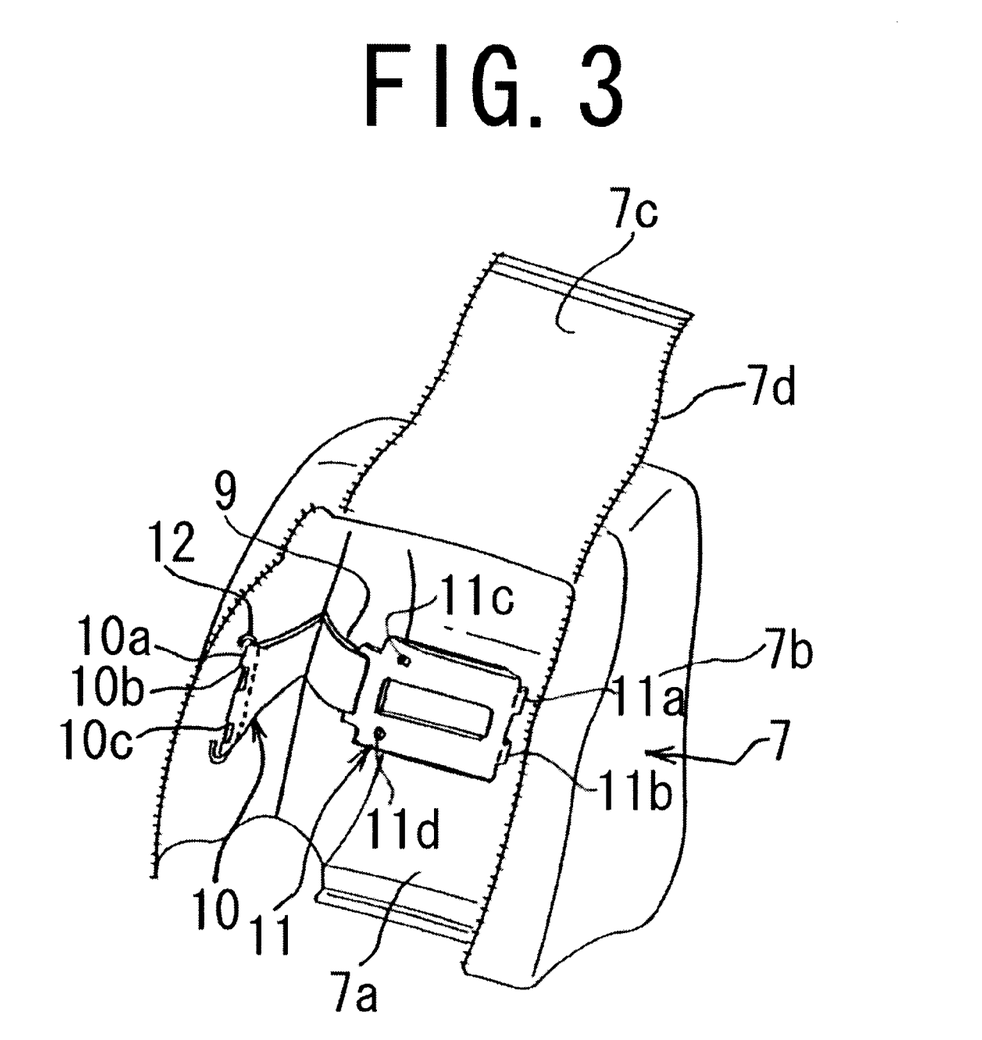
FIG. 3 is a perspective view showing a trim cover for a seat back in FIG. 2 from a rear side.

Two stay cloths 9 and 10 are installed inside the trim cover 7 by overlapping and sewing one end portion thereof with the sewing portion forming the breaking portion 8 as shown in FIG. 3. The stay cloths 9 and 10 are formed by employing a material such as a polyester nonwoven fabric, a cotton fabric or the like which is a little extended due to the inflating pressure of the air bag.

The structure mentioned above is set to a basic aspect (hereinafter, the common structure portions are described by using the same reference numerals). In accordance with a first embodiment, one wear plate 11 extending to a back portion of the seat back frame 5 as shown in FIG. 2 is provided in one stay cloth 9, one stay cloth 9 is taken into the cavity 3 from an opening edge of the back pad 2 so as to fasten a take-in end within the cavity 3, and the other stay cloth 10 is rolled in the back portion side of the back pad 2 from the front side of the air bag system 1 so as to fasten a roll-in end in the rear side of the back pad 2, whereby an assembly is performed.

As the wear plate 11, there is installed a wear plate which extends to the back portion of the seat back frame 5 by being gripped between the air bag system 1 and the side plate 6 and being commonly screwed and fixed by the fastening bolt 4 of the air bag system I and is provided with engaging hooks 11a and 11b engaged with an engaging wire 12 provided in the other stay cloth 10 mentioned below in an end edge portion as shown in FIG. 3. Since the wear plate 11 is fixed by the fastening bolt 4, bolt insertion holes 11c and lid are provided in a plate surface.

The wear plate 11 is provided in an end portion of the stay cloth 9 by mutually folding and sewing ends by a slit (not shown) provided in a standing flange portion lie. The engaging wire 12 is provided in such a manner as to be inserted to an inner portion of a hemming bag 10a provided in an end of the stay cloth 10 and partly expose an axis from notch portions 10b and 10c of the hemming bag 10a.

In order to assemble the seat back B so as to be provided with the respective elements, the fastening bolt 4 of the air bag system 1 is inserted to the bolt insertion holes 11c and 11d and the wear plate 11 is previously assembled in the back portion of the air bag system 1 at a time of covering the trim cover 7 over the back pad 2. Together therewith, the stay cloths 9 and 10 are separated into two directions from the sewing portion forming the breaking portion 8 of the trim cover 7, one stay cloth 9 is taken to the side portion of the air bag system 1 and the other stay cloth 10 is taken to the front side of the air bag system 1, whereby the air bag system 1 is wrapped.

In this assembling state, the air bag system 1 is assembled and accommodated in the cavity 3 of the back pad 2 together with the stay cloth 9, and the air bag system 1 is applied to a plate surface of the side plate 6 in such a manner as to grip the wear plate 11 between the air bag system 1 and the side plate 6 so as to be mounted and fixed to the side plate 6 by the fastening bolt 4, whereby one stay cloth 9 is taken into the cavity 3 from the opening edge of the back pad 2 and the take-in end thereof is fastened within the cavity 3.

The other stay cloth 10 is rolled in the rear side of the back pad 2 from the front side of the air bag system 1 and the engaging wire 12 is engaged with the engaging hooks 11a and 11b provided in the end edge portion of the wear plate 11 extending to the back portion of the seat back frame 5, whereby the roll-in end thereof is fastened in the rear side of the back pad 2. Accordingly, as well as the air bag system 1 is wrapped by two stay cloths 9 and 10, the air bag system 1 can be assembled so as to be connected and supported to the backing plate 11 and gripping and fixing the take-in end of each of the stay cloths 9 and 10 between the air bag system 1 and the side plate 6.

In a seat for a vehicle which is provided with the side air bag system structured in this manner, since the air bag system 1 is wrapped inside the stay cloths 9 and 10 so as to be mounted and installed in the side plate 6 of the seat back frame 5, an inflating pressure of the air bag can be directly received by the stay cloths 9 and 10 so as to be efficiently concentrated on the breaking portion 8 of the trim cover 7, thereby quickly breaking the breaking portion 8 of the trim cover 7.

The wear plate 11 is provided in one stay cloth 9, the wear plate 11 is gripped between the air bag system 1 and the side plate 6 so as to be commonly screwed and fixed by the fastening bolt 4 of the air bag system 1, the engaging wire 12 is provided in the other stay cloth 10 so as to be engaged with the engaging hooks 11a and 11b provided in the end portion edge of the wear plate 11 extending to the back portion of the seat back frame 5, whereby the ends of the stay cloths 9 and 10 are fastened to one wear plate 11. Accordingly, it is possible to easily assemble with a reduced number of parts and it is possible to securely wrap and accommodated the air bag system 1.

Figure 4:
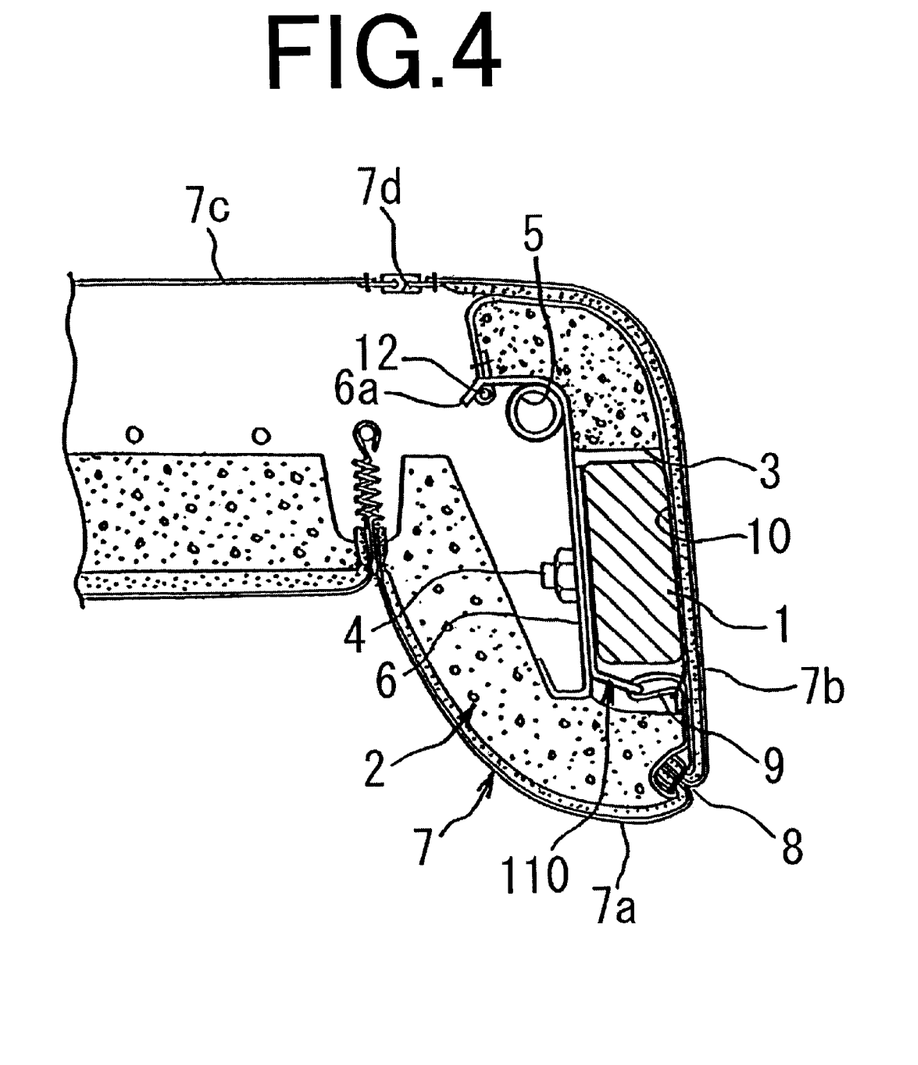
FIG. 4 is a cross sectional view showing a seat back of a seat with a side air bag system according to a second embodiment of the present invention in a side portion.

In accordance with a second embodiment, the stay cloths 9 and 10 are separated into two directions from the sewing portion forming the breaking portion 8 of the trim cover 7 as shown in FIG. 4, one stay cloth 9 is taken to the inner side from the cavity 3 of the back pad 2 and the end of one stay cloth 9 is fastened by a wear plate 110 provided in the other end of the stay cloth 9, whereby an assembly is performed. The wear plate 110 is, in the same manner as that of the first embodiment, provided by inserting the fastening bolt 4 of the air bag system 1 to bolt insertion holes 110a and 110b, previously assembling the wear plate 110 to the back portion of the air bag system 1, being gripped between the air bag system 1 and the side plate 6 and thereafter being commonly fastened and fixed by the air bag system 1 and the fastening bolt 4.

The other stay cloth 10 is rolled in the rear side of the back pad 2 from the front side of the air bag system 1 and the engaging wire 12 provided in the other end of the other stay cloth 10 is engaged with the rear end edge of the side plate 6 extending to the rear portion of the seat back frame 5, whereby the end thereof is fastened.

Figure 5:
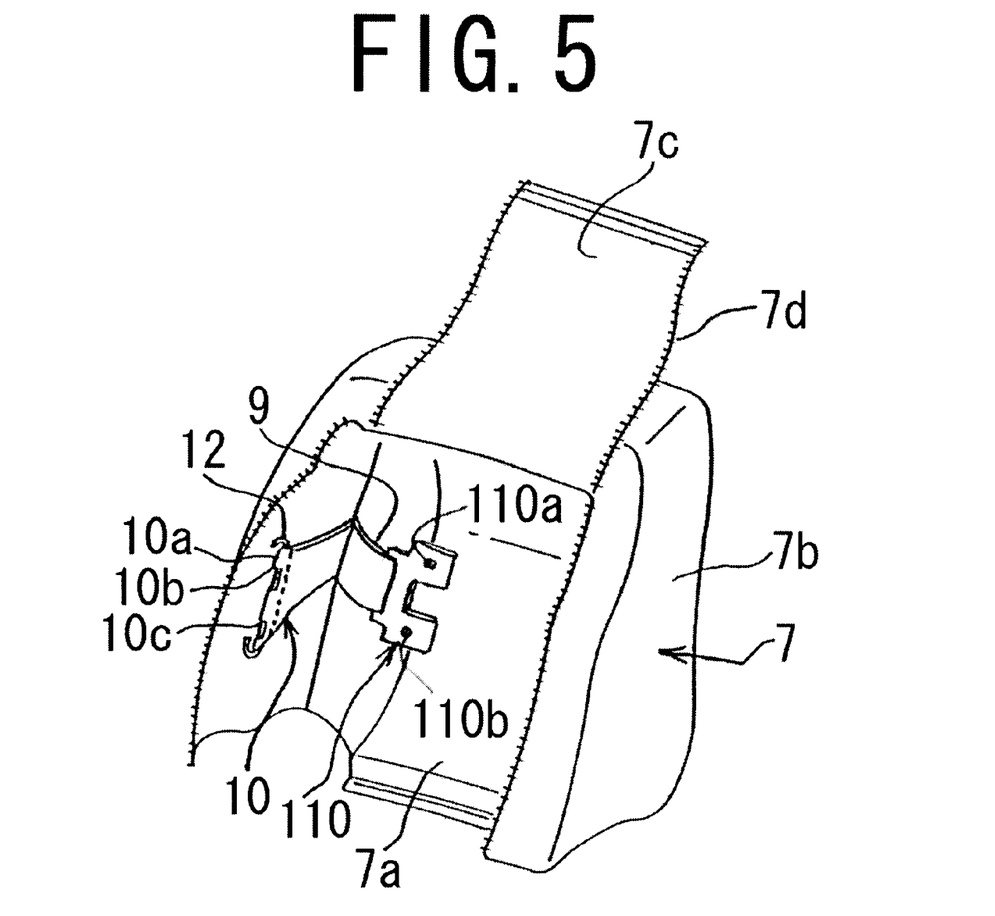
FIG. 5 is a perspective view showing a trim cover for a seat back in FIG. 4 from a rear side.
Figure 6:
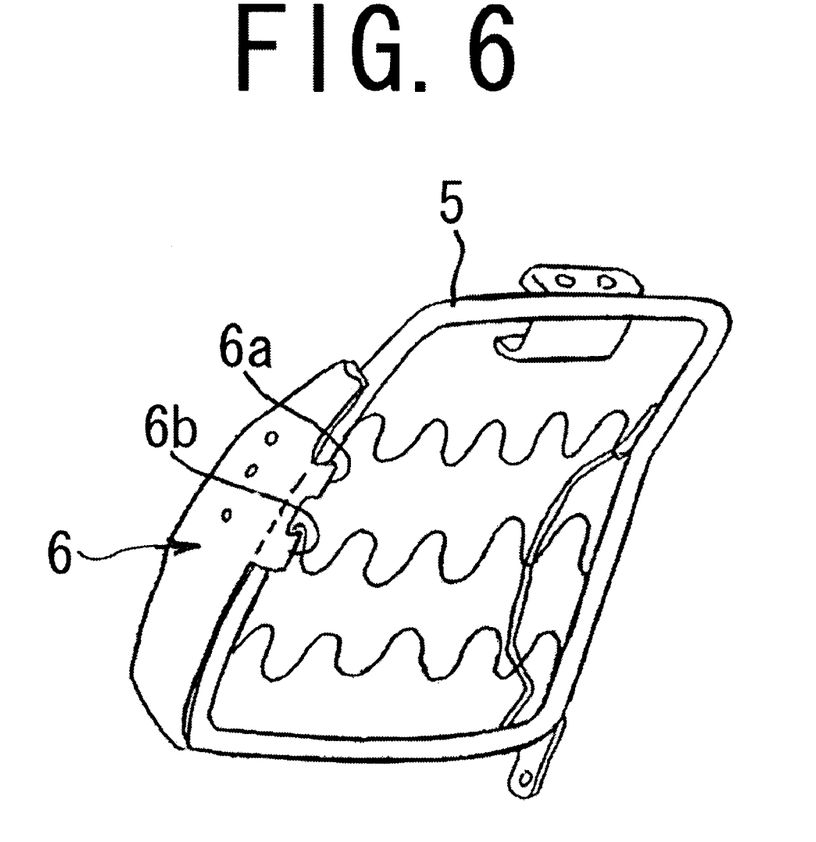
FIG. 6 is a perspective view showing a seat back frame for the seat back in FIG. 4 from a rear side.

The engaging wire 12 is inserted to the inner portion of the hemming bag 10a provided in the end of the stay cloth 10 as shown in FIG. 5 and is provided so as to partly expose the axis thereof from the notch portions 10b and 10c of the hemming bag 10a. Further, engaging hooks 6a and 6b engaged with the engaging wire 12 at the axis exposing from the hemming bag 10a are provided in the rear end edge of the side plate 6 as shown in FIG. 6.

Also in the seat provided with the side air bag system structured in this manner, since the air bag system 1 is wrapped inside the stay cloths 9 and 10 so as to be mounted and installed in the side plate 6 of the seat back frame 5, an inflating pressure of the air bag can be received by the stay cloths 9 and 10 so as to be efficiently concentrated on the breaking portion 8 of the trim cover 7, thereby quickly breaking the breaking portion 8 of the trim cover 7. Accordingly, it is possible to assemble so as to securely break the breaking portion 8 of the trim cover 7 due to the inflating pressure of the air bag.

The stay cloths 9 and 10 are structured such that the wear plate 110 gripped between the air bag system 1 and the side plate 6 and commonly fastened and fixed by the fastening bolt 4 of the air bag system 1 is provided in the end portion of the stay cloth 9 and the engaging wire 12 is provided in the end of the stay cloth 10 so as to be engaged with the rear end edge of the side plate 6 extending to the rear portion of the seat back frame 5, whereby the ends thereof are fastened. Accordingly, it is possible to easily assemble with a reduced number of parts and it is possible to securely wrap and accommodate the air bag system 1.

Figure 7:
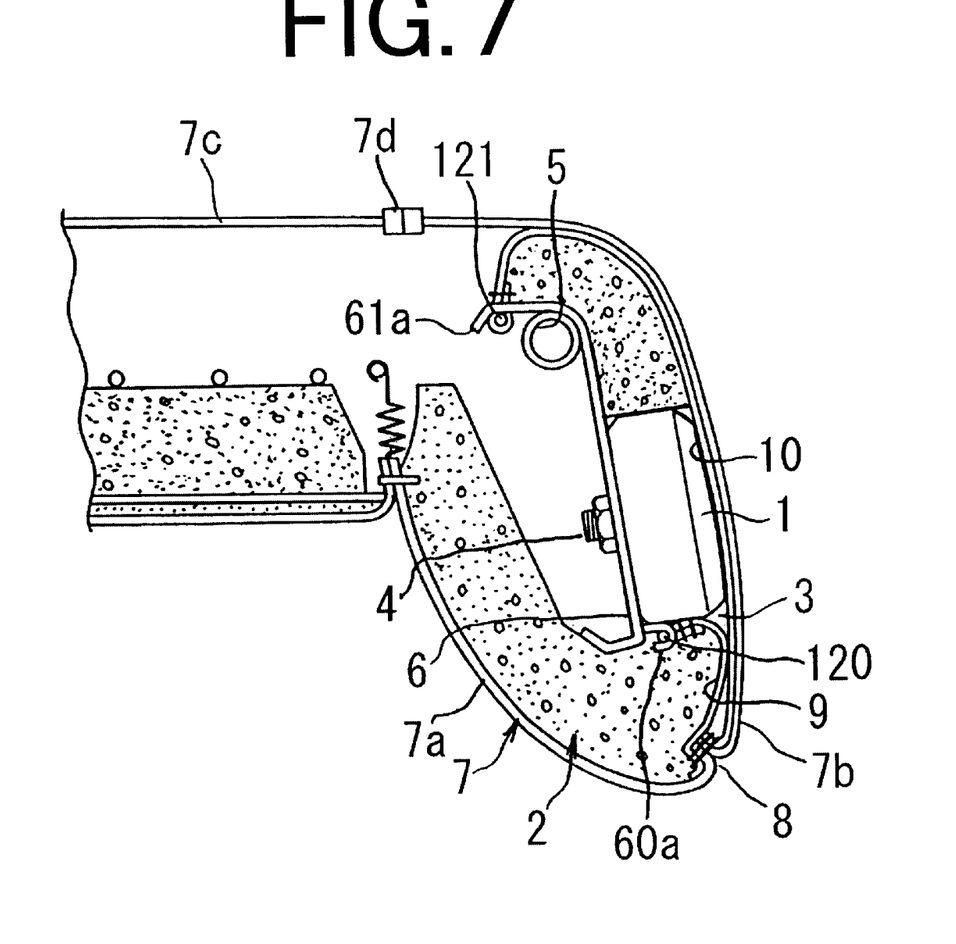
FIG. 7 is a cross sectional view showing a seat back of a seat with a side air bag system according to a third embodiment of the present invention in a side portion.

In accordance with a third embodiment, the stay cloths 9 and 10 are separated into two directions from the sewing portion forming the breaking portion 8 of the trim cover 7 as shown in FIG. 7, one stay cloth 9 is taken to the inner side from the cavity 3 of the back pad 2 and an engaging wire 120 provided in the other end of the stay cloth 9 is engaged with standing pieces 60a (only one of them is illustrated) provided in a side surface of the side plate 6 which is closer to the air bag system 1, whereby the end thereof is fastened.

The other stay cloth 10 is, in the same manner as that of the second embodiment, rolled in the rear side of the back pad 2 from the front side of the air bag system 1 and the engaging wire 121 provided in the other end of the other stay cloth 10 is engaged with the rear end edge of the side plate 6 extending to the rear portion of the seat back frame 5, whereby the end thereof is fastened.

Figure 8:
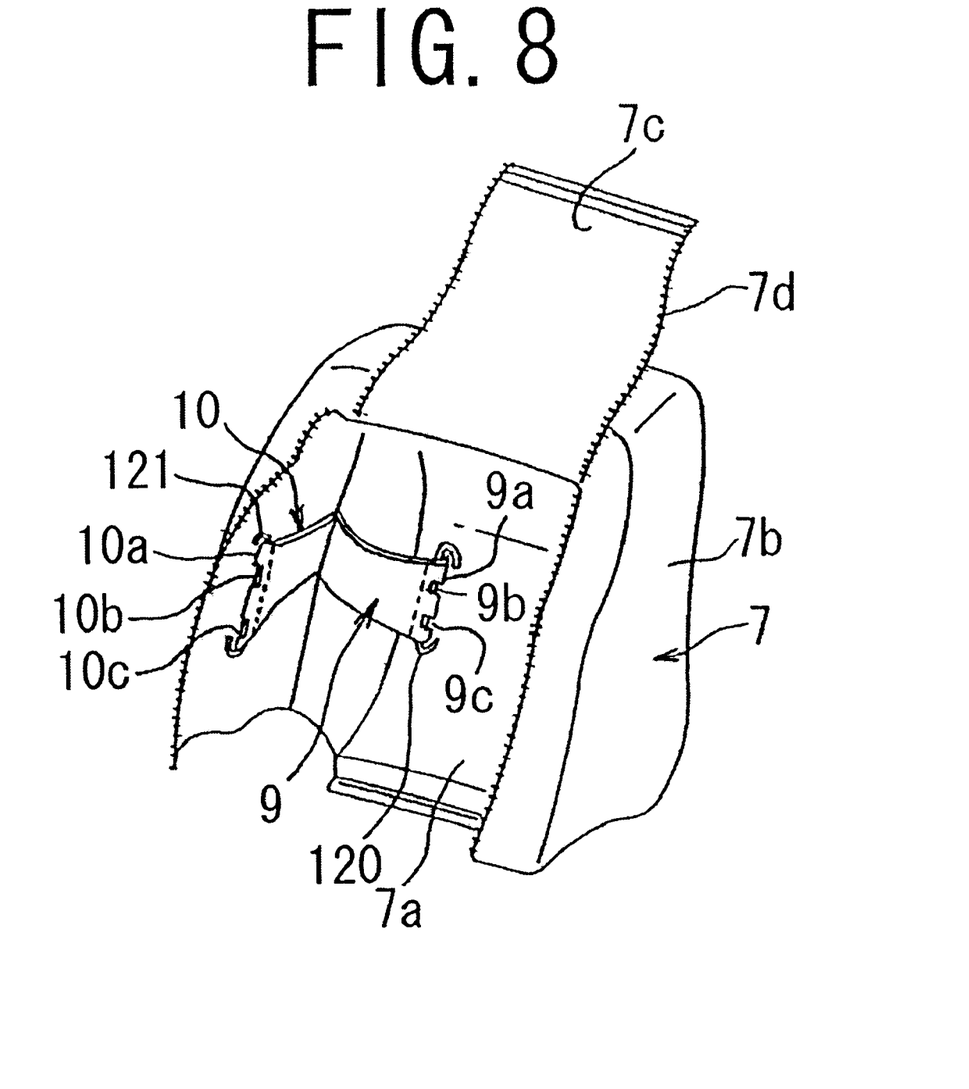
FIG. 8 is a perspective view showing a trim cover for a seat back in FIG. 7 from a rear side.
Figure 9:
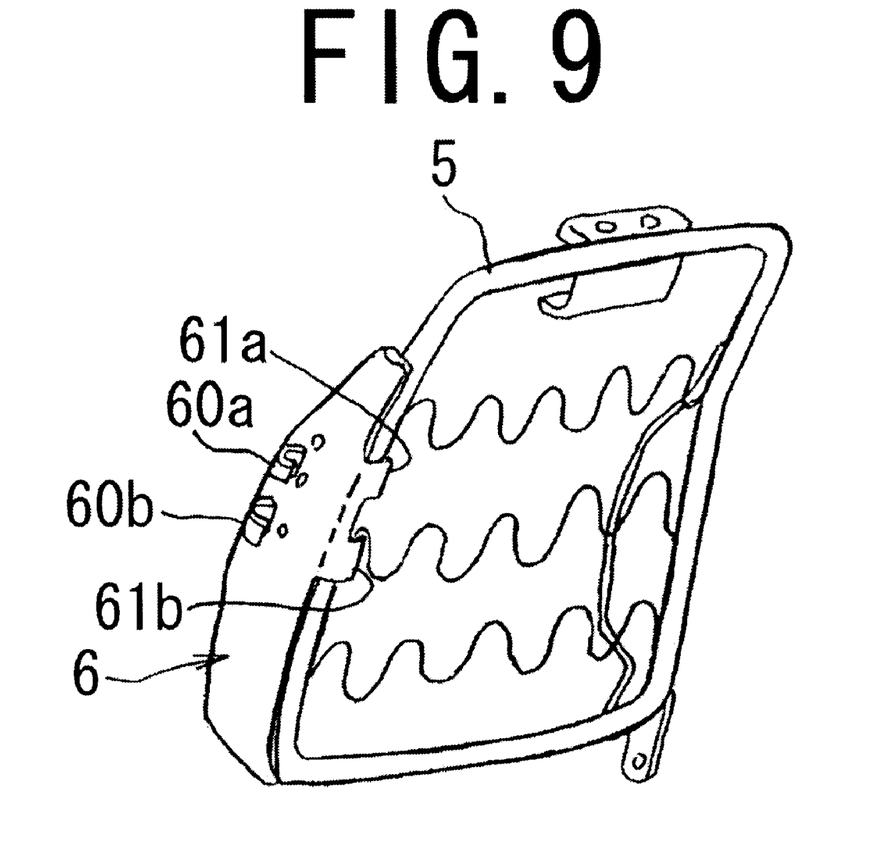
FIG. 9 is a perspective view showing a seat back frame fox the seat back in FIG. 7 from a rear side.

The engaging wires 120 and 121 are inserted to the inner portion of the hemming bags 9a and 10a provided in the ends of the stay cloths 9 and 10 as shown in FIG. 8 and is provided so as to partly expose the axis thereof from the notch portions 9b, 9c, 10b and 10c of the hemming bags 9a and 10a. The standing pieces 60a and 60b engaging with the engaging wire 120 are formed so as to form a cut and bent hook as shown in FIG. 9, and engaging hooks 61a and 61b engaging with the engaging wire 121 can be provided in the rear end edge of the side plate 6.

Also in the seat provided with the side air bag system structured in this manner, since the air bag system 1 is wrapped inside the stay cloths 9 and 10 so as to be mounted and installed in the side plate 6 of the seat back frame 5, an inflating pressure of the air bag can be received by the stay cloths 9 and 10 so as to be efficiently concentrated on the breaking portion 8 of the trim cover 7, thereby quickly breaking the breaking portion 8 of the trim cover 7. Accordingly, it is possible to assemble so as to securely break the breaking portion 8 of the trim cover 7 due to the inflating pressure of the air bag.

The stay cloths 9 and 10 are structured such that the engaging wires 120 and 121 are provided in each of the ends, the engaging wire 120 is engaged with the standing pieces 60a and 60b provided in the side surface of the side plate 6 which is closer to the air bag system 1 and the engaging wire 121 is engaged with the engaging hooks 61a and 61b provided in the rear end edge of the side plate 6 extending to the rear portion of the seat back frame 5, whereby the ends thereof are fastened. Accordingly, it is possible to easily assemble with a reduced number of parts and it is possible to securely wrap and accommodate the air bag system 1.

Figure 10:
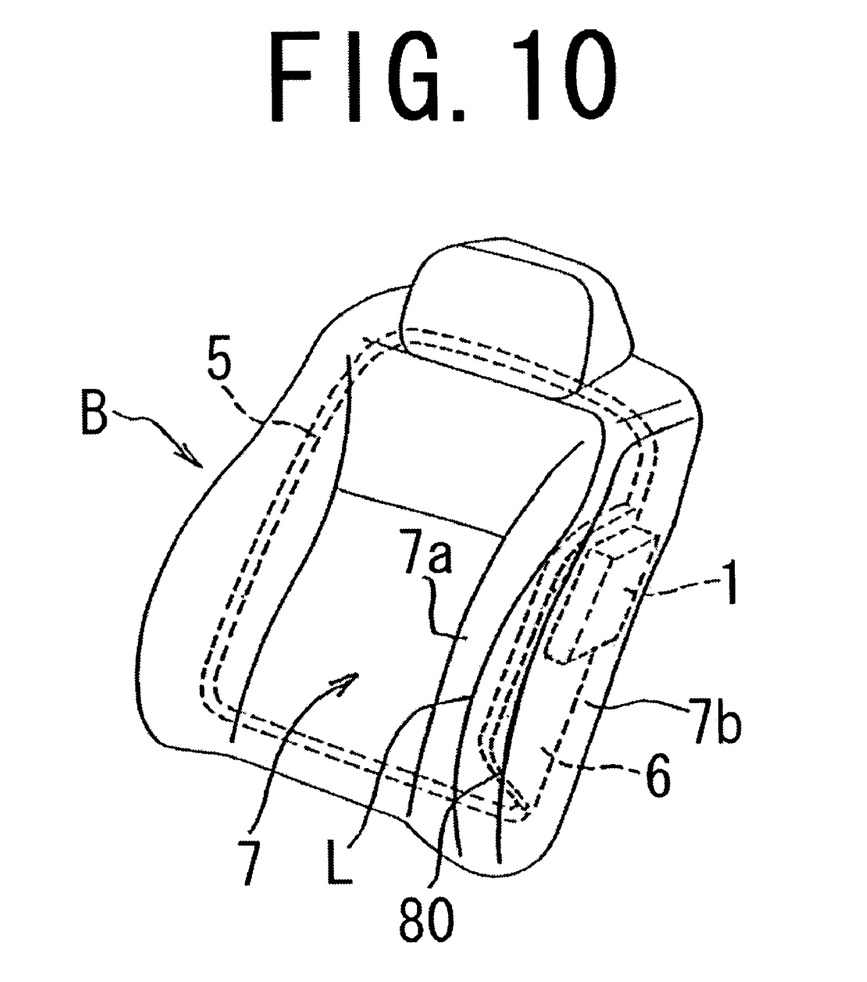
FIG. 10 is a perspective view showing a seat back assembled so as to be provided with a trim cover with a breaking portion according to another embodiment as a seat with a side air bag system according to the present invention.
Figure 11:
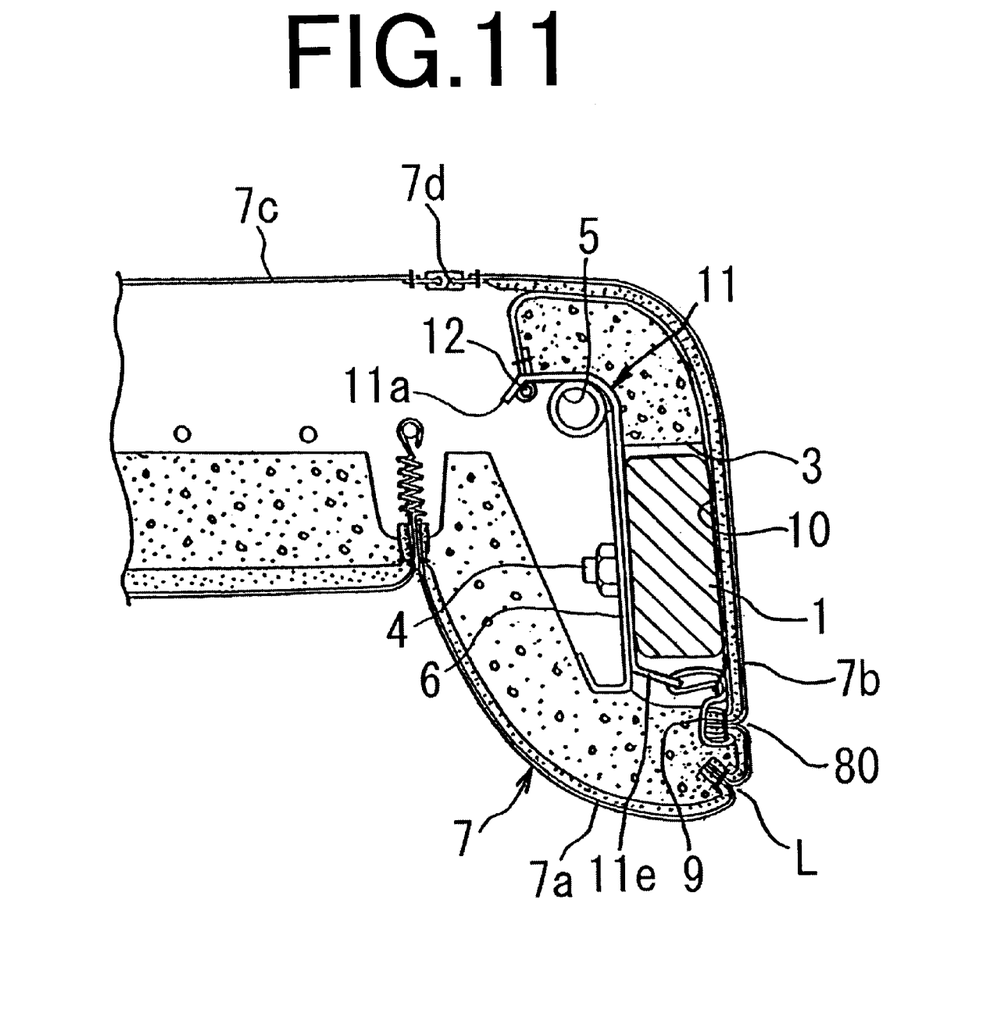
FIG. 11 is a cross sectional view showing a side portion of the seat back shown in FIG. 10.

As the breaking portion of the trim cover 7, in place of the embodiment mentioned above, the structure can be made such that a whole structure thereof is made substantially in parallel to a sewing portion L between the front surface cover portion 7a and the side surface cover portion 7b which are sewed so as to form a bag shape as shown in FIG. 10 and a sewing portion corresponding to a breaking portion 80 of the trim cover 7 is provided within an area of the side surface cover portion 7b so as to be closer to the installing position of the air bag system 1 as shown in FIG. 11. The sewing portion corresponding to the breaking portion 80 can be formed by shaping and cutting the side surface cover portion 7b into two sheets comprising front and rear portions and sewing the sheets to each other.

Accordingly, it is possible to further quickly cut the sewing portion corresponding to the breaking portion 80 of the trim cover 7 so as to assemble the air bag so that the air bag can quickly inflate and develop, the stay cloths 9 and 10 can be assembled with a short necessary length, and it is possible to obtain a splendid appearance due to a double stitch structure of the sewing portion L between the front surface cover portion 7a and the side surface cover portion 7b which are wholly sewed so as to form a bag shape and the sewing portion corresponding to the breaking portion 80 of the trim cover 7.

As mentioned above, the seat provided with the side air bag system according to the present invention is useful since the stay cloths are easily assembled so as to wrap the air bag system and the stay cloths are provided in such a manner as to wrap the air bag system by the stay cloths and concentrate the inflating pressure of the air bag on the sewing portion corresponding to a breaking portion of a trim cover, thereby quickly inflating and developing the air bag.

What is claimed is:

1. A seat provided with a side air bag, comprising:
   an air bag system installed so as to be capable of inflating and developing an air bag outward due to a gas pressure, and being positioned within a cavity provided in a side portion of a back pad so as to be mounted to a side plate of a seat back frame;
   a sewing portion of a trim cover covering a provision side of the air bag system, said sewing portion forming a breaking portion of the trim cover according to an inflation and development of the air bag;
   first and second stay cloths sewed to the sewing portion corresponding to the breaking portion of the trim cover at one end portions thereof so as to wrap the air bag system, said stay cloths being provided inside the trim cover; and
   a wear plate extending to the seat back frame and provided in the other end portion of the first stay cloth;
   wherein the first stay cloth is taken into the cavity from an opening edge of the back pad so as to grip and fix the wear plate between the air bag system and the side plate, the second stay cloth is rolled in a rear side of the back pad from a front side of the air bag system, an engaging wire provided in the other end of the second stay cloth is engaged with a rear end portion of the wear plate, and the air bag system is wrapped by the first and second stay cloths.

2. A seat provided with a side air bag, comprising:

an air bag system installed so as to be capable of inflating and developing an air bag outward due to a gas pressure, and being positioned within a cavity provided in a side portion of a back pad so as to be mounted to a side plate of a seat back frame;

a sewing portion of a trim cover covering a provision side of the air bag system, said sewing portion forming a breaking portion of the trim cover according to an inflation and development of the air bag;

first and second cloths each having first and second end portions;

said first and second cloths sewed to the sewing portion corresponding to the breaking portion of the trim cover at first end portions thereof so as to wrap the air bag system, said stay cloths being provided inside the trim cover; and a wear plate extending to the seat back frame and provided in the second end portion of the first stay cloth;

wherein the first stay cloth is taken into the cavity from an opening edge of the back pad so as to grip and fix the wear plate between the air bag system and the side plate, the second stay cloth is rolled in a rear portion side of the back pad from a front side of the air bag system, a trim wire is provided in the second end portion of the second stay cloth and engaged with a rear end edge of the side plate, and the air bag system is wrapped by the first and second stay cloths.

* * * * *